US005654750A

United States Patent [19]
Weil et al.

[11] Patent Number: 5,654,750
[45] Date of Patent: Aug. 5, 1997

[54] AUTOMATIC RECORDING SYSTEM

[75] Inventors: Richard S. Weil, Highland Park; Dana Hodgdon, Evanston, both of Ill.; Neil Steinberg, Los Angeles, Calif.

[73] Assignee: VideoRec Technologies, Inc., Chicago, Ill.

[21] Appl. No.: 393,271

[22] Filed: Feb. 23, 1995

[51] Int. Cl.⁶ .................................................. H04N 7/18
[52] U.S. Cl. ........................... 348/143; 348/77; 348/154
[58] Field of Search .............................. 348/77, 143, 151, 348/154, 155; H04N 7/18

[56] References Cited

U.S. PATENT DOCUMENTS

| | | | |
|---|---|---|---|
| 2,675,462 | 4/1954 | Newton | 348/373 |
| 3,891,842 | 6/1975 | Strusinski | 348/373 |
| 4,503,854 | 3/1985 | Jako | 606/11 |
| 4,511,886 | 4/1985 | Rodriguez | 348/154 |
| 4,598,311 | 7/1986 | Bellina | 348/77 |
| 4,881,135 | 11/1989 | Heilweil | 348/151 |
| 4,951,147 | 8/1990 | Aknar | 348/154 |
| 5,495,288 | 2/1996 | Broady | 348/155 |

*Primary Examiner*—Howard W. Britton
*Attorney, Agent, or Firm*—Dorn, McEachran, Jambor & Keating

[57] ABSTRACT

A system for automatically producing audio and video records of every procedure performed in a surgical operating room. Video cameras are mounted in the operating room to capture video of each surgical procedure performed. Microphones are mounted in the operating room to pick up audio from each procedure. Videocassette recorders located at a remote master recording facility communicate over telephone lines with the equipment at the operating room and create an audio/video record from the video images and audio generated by the video cameras and microphones. Motion and photoelectric sensors mounted in the operating room detect the presence of persons and start and stop the videocassette recorders at the recording facility in response thereto.

6 Claims, 6 Drawing Sheets

AUTOMATIC RECORDING SYSTEM

BACKGROUND AND SUMMARY OF THE INVENTION

The present invention relates to audio and visual recording systems, and more particularly to an automatic recording system for surgical procedures.

Healthcare institutions are faced with exciting and demanding challenges. Surgical procedures are increasingly complex. Resource management must be cost-effective. Quality patient care requires continuous upgrading of skills. The present invention provides a valuable tool that can capture, preserve and retrieve information that affects these areas.

A system for automatically producing audio/video records of each procedure performed in a surgical operating room is provided. The records produced are remote, confidential, archival and retrievable.

The system includes video cameras mounted at strategic locations in the operating room to generate video images of each surgical procedure performed, and microphones strategically mounted to pick up audio from each procedure. Recording means located at a recording site remote from the operating room create audio/video records from the video images and audio generated by the video cameras and microphones. Sensors mounted in the operating room detect the presence of persons and automatically trigger the recording means in response thereto.

Original recordings of each camera view and audio for every procedure performed in the operating room can be securely maintained by a third party. Hospital staff are not required to adjust equipment, initiate recording, or take any other steps to initiate the automatic creation of records. Recording begins automatically upon any sort of activity in the operating room, and continues until complete cessation of activity. When requested, a copy of a record corresponding to any procedure performed or time segment thereof can be produced.

The system of the present invention can be used in multiple, beneficial ways. One area affected is resource management. The information provided by the video records can help to maximize utilization of the operating room. Scheduling and use of surgical suites are easily assessed and adjusted by viewing the video records. Use of equipment can be made more cost-effective. Evaluation of procedures and performance is easier and more efficient.

The records generated by the present invention also provide a reliable testament to the capability of individual physicians and surgical teams. Independently produced records that show physicians performing procedures several times are a thorough way of confirming capability. The records provide unbiased documentation of skill levels when credentials are sought or need to be substantiated in a legal challenge. Efficiency and privacy of peer review sessions is maximized, and the emotional toll caused by subjective reconstruction of events is minimized.

The recording system is also a great asset in risk management. Review of the video record of a procedure assists in the evaluation process when an unexpected outcome occurs. Malpractice allegations can be addressed quickly and effectively. The video records can help speed the discovery process and possibly lead to rapid resolution if the records demonstrate malpractice allegations to be unfounded.

The system of the present invention can be utilized as a valuable teaching tool as well. Video records of prior procedures can help a surgical team anticipate the needs of an upcoming surgery and to reach the most informed conclusions. The records can be an effective means of teaching the staff about a new technique, an unusual case or how to operate new equipment. The video files permit fast, easy, and private self-critiquing of one's own skills.

These and other objects and advantages of the present invention will become apparent from the following detailed description and accompanying drawings.

DETAILED DESCRIPTION OF THE INVENTION

Figure 1:
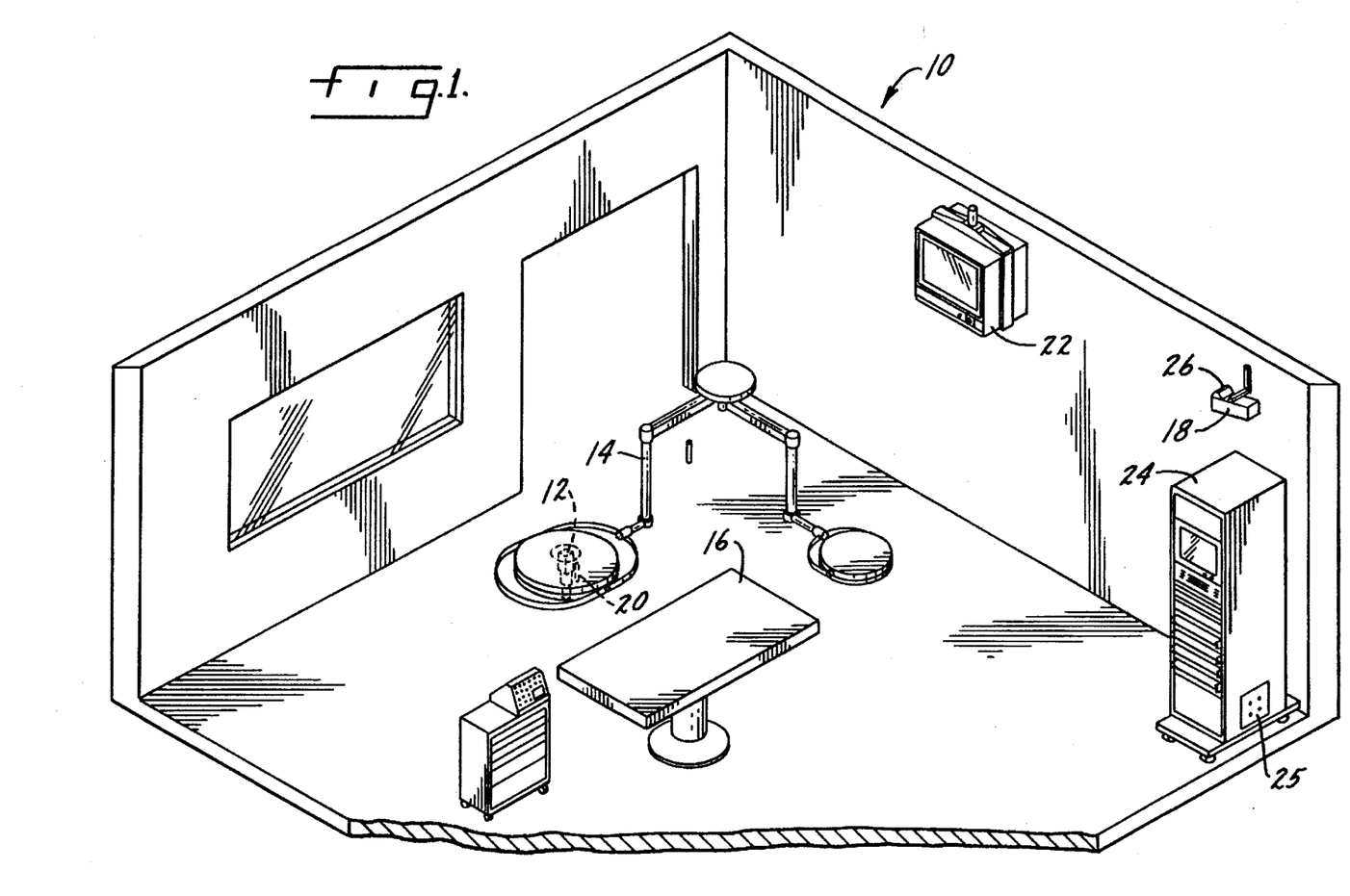
FIG. 1 is an overview of an operating room equipped with the system of the present invention.
Figure 2:
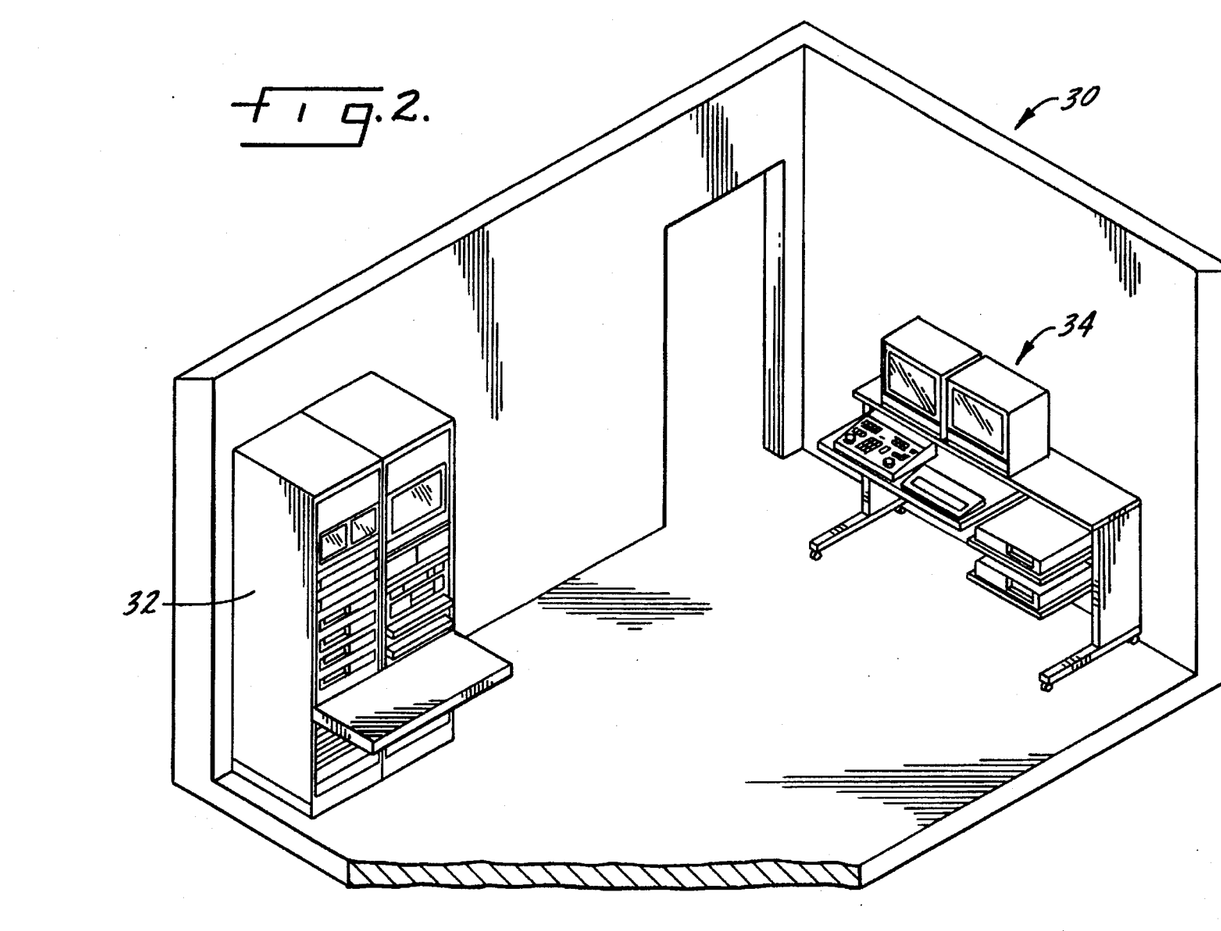
FIG. 2 is an overview of a master recording facility equipped with the system of the present invention.

A broad overview of the automatic recording system of the present invention is first given, with reference to FIGS. 1 and 2. A more detailed description will follow with reference to FIGS. 3-5.

FIG. 1 shows selected system equipment located in an operating room 10. A video camera 12 equipped with a zoom lens may be mounted to a movable surgical light fixture 14 above operating table 16 to provide a surgical "overhead" picture. A second video camera 18 is mounted in a corner, or sidewall, near the ceiling of the operating room to provide an "overview" picture. Also provided is a video input port that may be connected to a user-supplied scope instrument equipped with a camera. Thus, three video perspectives of each procedure performed may be captured.

A microphone 20 is mounted next to overhead camera 12 to pick up the audio from the surgeon's position. A second microphone (not shown in FIG. 1) should be mounted in a position near the anesthesiologist. Also provided is a microphone input port to permit use of a user-supplied wireless microphone system. Thus, in addition to three video perspectives, three different audio sources are recorded for each procedure.

A ceiling-mounted monitor 22 is mounted for observation by the surgical team. Monitor 22 is controlled by a foot switch located next to the surgical table, permitting the surgeon to sequence through the various camera signals. Control equipment in equipment rack 24 controls and coordinates the operating room audio and video equipment. Rack 24 has a connector panel 25 which may include, for example, the scope camera video input port.

Activation of the equipment in operating room 10 to record a procedure is triggered by a record control system which includes two sensors. The first sensor is motion detector 26, located on top of overview camera 18. The second sensor (not shown) is a photoelectric sensor mounted to surgical overhead fixture 14 next to overhead camera 12 and microphone 20. Upon activation of either or both sensors, appropriate signals are generated at the operating room site and relayed via modem and dedicated telephone lines to commence recording at the master recording facility.

An overview of the master recording facility is provided in FIG. 2. Master recording facility 30 includes an equipment rack 32 which holds recording equipment, such as video cassette recorders (VCRs), as well as video monitors. The equipment in rack 32 communicates, via modem, with the equipment in rack 24 at the operating room site. The recording equipment is activated automatically upon the presence of person(s) in operating room 10. Each procedure taking place is stored and catalogued as a separate video/audio record at recording site 30. Recording site 30 is also equipped with computer terminals 34 to assist in the cataloging, storing, retrieving and duplication of records.

Figure 3:
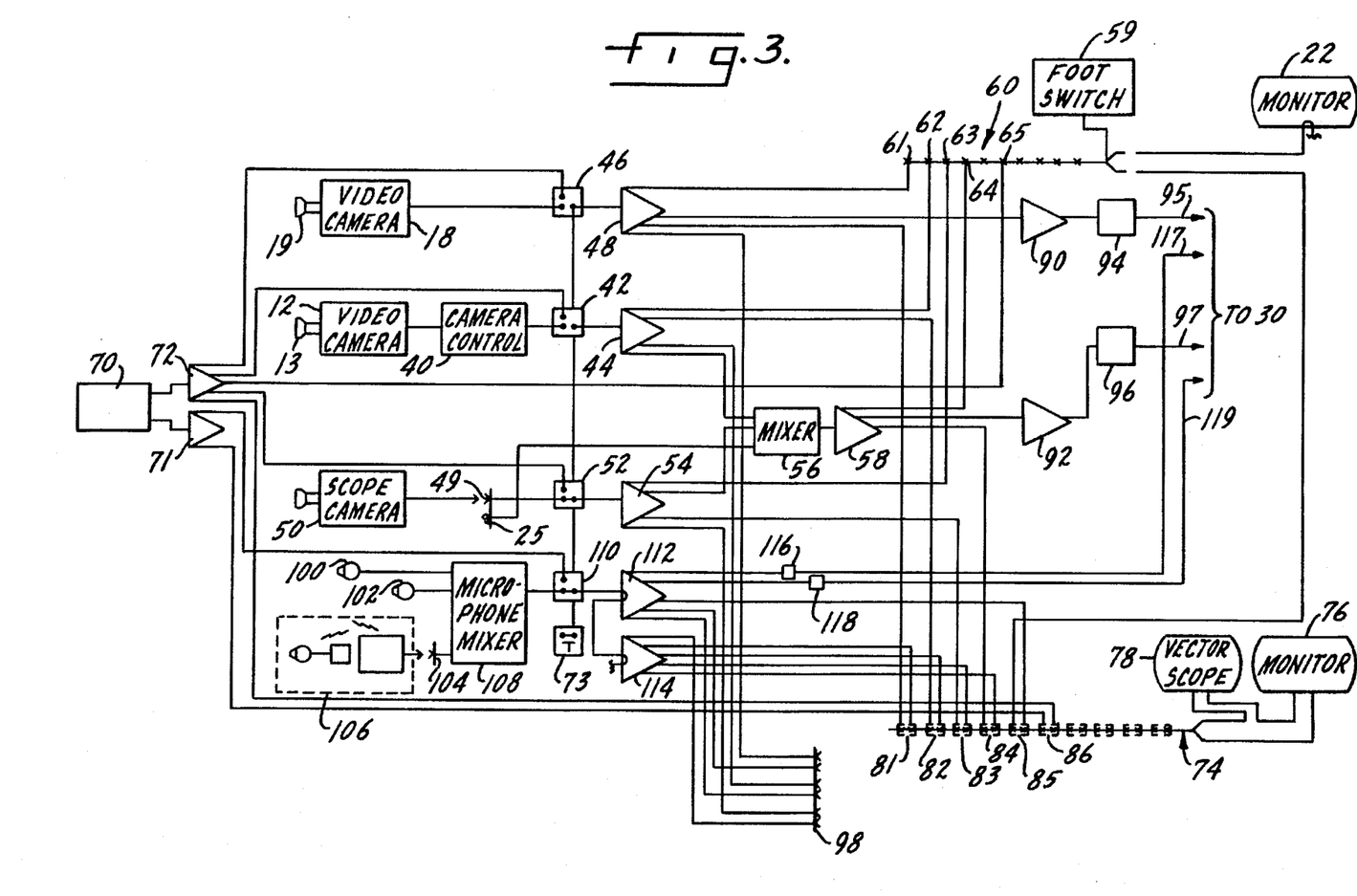
FIG. 3 is a detailed diagram of the operating room equipment and connections.

A detailed diagram of system equipment and connections in operating room, or transmit site, 10 is shown in FIG. 3. Overhead video camera 12 (CAM-2) has 700 television lines of resolution, a 12-to-1 zoom lens 13, and a close up adapter. It is mounted on light fixture 14 above operating table 16. Other mounting arrangements are also possible. Overhead camera 12 and its lens are controlled by camera control unit 40 (CCU-2) in equipment rack 24. The output of overhead camera 12 is fed, via test relay 42 (RLY-2), to video distribution amplifier 44 (VDA-2). From distribution amplifier 44, the overhead camera signal is sent to further points in the system (to be described herein).

Overview camera 18 (CAM-1) is located in a stationary position in a corner or on a sidewall of operating room 10. It is equipped with a wide angle lens 19 and should have 682 (horizontal)×492 (vertical) pixels, with 430 television lines. The video output of camera 18 is fed, via test relay 46 (RLY-1), to video distribution amplifier 48 (VDA-1) for distribution within the system.

A connector panel 25 includes a video input port 49 which permits insertion of a video signal into the system from a user-supplied scope-type camera 50 (CAM-3). Panel 25 may be on equipment rack 24, as shown in FIG. 1, or it may be located in a separate wall panel. The signal from port 49 is fed, via test relay 52 (RLY-3), to a video distribution amplifier 54 (VDA-3) for distribution within the system. The video signal from camera 50 also connects (via amplifier 54 or directly from panel 25) to picture-in-picture 56 (PIP-1), which mixes the video from scope camera 50 with the video from overhead camera 12 (which is recieved via distribution amplifier 44). The mixed signal output from picture-in-picture unit 56 is fed to video distribution amplifier 58 (VDA-4) for further distribution. It is important that the several signals from the cameras be combined prior to recording.

Two 10×1 switchers are located in equipment rack 24. Switcher 60 (SW-1) connects to monitor 22 (MON-2) which is ceiling-mounted for observation by the surgical team. Switcher 60 is controlled by foot switch 59 located next to surgical table 16. Foot switch 59 permits the surgeon to easily sequence monitor 22 through the five different video input signals 61–65 connected to switcher 60. Video input 61 is the overview camera signal, received from distribution amplifier 48. Input 62 is the overhead camera signal, received from distribution amplifier 44. Input 63 is the scope camera signal, received from distribution amplifier 54. Input 64 is the mixed scope-overhead camera signal from picture-in-picture unit 56, received via distribution amplifier 58.

The fifth input signal on switcher 60, input 65, is a color bar test signal received from test signal generator 70 (TSG-1), via video distribution amplifier 72 (VDA-5). The color bar test signal is also connected to test relays 42, 46 and 52. Thus, color bar test signals may be injected into the system in place of the three camera video signals for video path testing by depressing test button 73.

The second switcher, switcher 74 (ESW-1), is connected to a 13" color monitor 76 (MON-1) rack mounted in equipment rack 24. The video output from switcher 74 is fed into monitor 76 through a video waveform/vectorscope unit 78 (WFM/VEC-1). Monitor 76, then, displays the waveform and vectorscope measurements as an overlay on the selected camera signal from switcher 74. The waveform/vectorscope overlay can be turned on/off at unit 78.

Six inputs 81–86 are selectable from switcher 74. Input 81 comes from overview camera 18 via distribution amplifier 48. Input 82 comes from overhead camera 12 via distribution amplifier 44. Input 83 comes from scope camera 50 via distribution amplifier 54. Input 84 is the mixed scope-overhead signal from picture-in-picture unit 56 via distribution amplifier 58. Input 85 is the video signal being fed to ceiling monitor 22 from switcher 60. Input 86 is the color bar test signal received from generator 70 via distribution amplifier 72. As will be explained below, switcher 74 also receives audio signals from the microphones mounted in operating room 10 and feeds them to monitor 76.

The outputs from overview camera 18 (via distribution amplifier 48) and picture-in-picture unit 56 (via distribution amplifier 58) are connected, respectively, to equalizing video distribution amplifiers 90 (EQ/VDA-1) and 92 (EQ/VDA-2). The outputs from amplifiers 90 and 92 are fed through hum eliminators 94 (HE-1) and 96 (HE-2). These two outputs 95 and 97 from the hum eliminators representing, respectively, an overview and a combined overhead/scope view, are the video outputs of the operating room, or transmit site, portion of the system. They are connected to telephone-company supplied codecs, which transmit the video pictures to master recording facility 30 to be stored and catalogued.

The final video connections in operating room 10 are to a wall panel 98. A signal from each of the three cameras (via their associated distribution amplifiers) is fed to video output ports on panel 98 for distribution to the hospital. This permits the hospital to, at their discretion, connect appropriate display and/or recording devices to the output ports of panel 98.

Two shotgun microphones are used in the system to capture the voice audio in operating room 10. Microphone 100 (MIC-1) is mounted next to overhead camera 12 to pick up the audio from the surgeon's position. Microphone 102 (MIC-2) is mounted in a position near the anesthesiologist. Wall plate 104 provides an input for a third microphone connection. Typically, the third microphone would be a wireless microphone system 106 used by the surgeon.

The audio output from each microphone is fed directly to automatic microphone mixer 108 (MIX-1). The output of mixer is connected to, via test relay 110 (RLY-4), two audio distribution amplifiers 112 (ADA-1) and 114 (ADA-2). From distribution amplifier 112, the audio signal is distributed to two 600 ohm to 600 ohm isolation transformers 116 (T-1) and 118 (T-2). The outputs 117 and 119 from, respectively, transformers 116 and 118 represent the audio outputs of the operating room portion of the system. These outputs are connected to telephone company supplied codecs, which transmit the audio signals to master recording site 30 for recording and cataloging.

Test signal generator 70, in addition to the color bar video test signal, generates an audio test tone. The audio test tone is fed from generator 70 to audio distribution amplifier 71 (ADA-3) for distribution through the system. One output from amplifier 71 goes to test relay 110. This allows an audio test tone to be injected into the system in place of the audio signals received from the microphones for audio path testing.

The microphone audio is also fed to switcher 74, permitting both audio and video confirmation at equipment rack 24. Input ports 81–84, in addition to their respective video connections, are fed the mixed microphone audio from distribution amplifier 114. Input port 85 receives the microphone audio from distribution amplifier 112. Input port 86 receives the audio test tone from distribution amplifier 71.

Wall panel 98, which has three output ports for the three camera signals to permit hospital access, is also fed the microphone audio signal. One port receives its audio signal from distribution amplifier 112, while the other two ports receive their signals from distribution amplifer 114.

Figure 4:
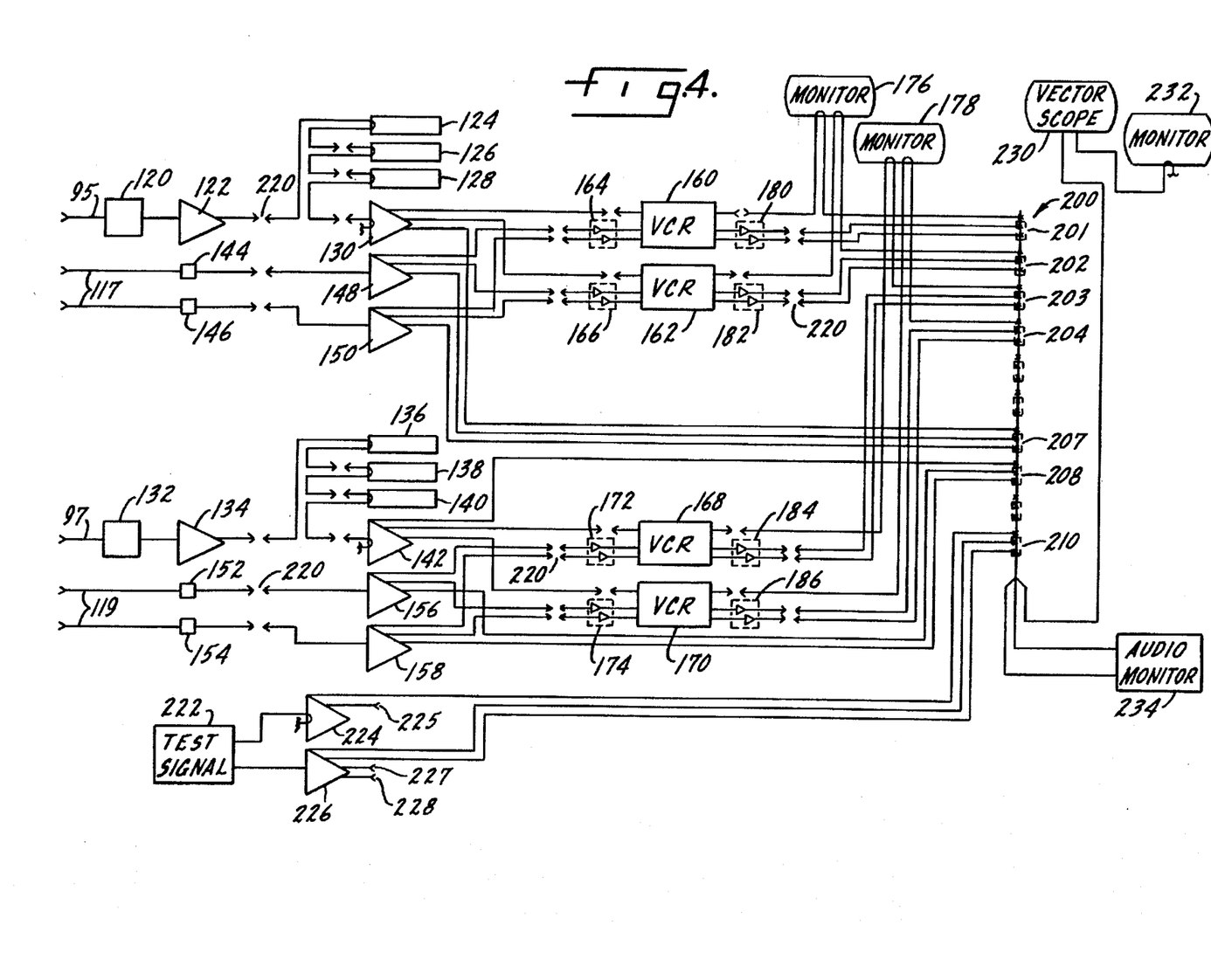
FIG. 4 is a detailed diagram of the master recording facility equipment and connections.

FIG. 4 illustrates in detail the equipment and connections at master recording facility, or receive site, 30. Video output 95 from the telephone company codec, representing the operating room overview camera video, is connected to hum eliminator 120 (HE-3), which in turn is connected to equalizing video distribution amplifier 122 (EQ/VDA-3).

The video output from amplifier 122 is connected to time code generator/character inserter 124 ("A"). Time code generator/character inserter 124 places time code characters on each field of video. The output from inserter 124 is fed to location/date inserter 126 ("B"). Inserter 126 places the location of the operating room and that days date on each field of video. Inserter 126 feeds the video signal to ID/logo inserter 128 ("C"). Inserter 128 places a company logo, trademark or other indicator on each video signal. Video output from inserter 128 is connected to video distribution amplifier 130 (VDA-6) for further distribution of the video signal within the master recording facility.

Output 97 from the telephone codec, representing the combined overhead/scope camera video, follows a similar path to the overview video output 97 at master recording site 30. It is first fed through hum eliminator 132 (HE-4) and equalizing video distribution amplifier 134 (EQ/VDA-4). From amplifier 134, the signal is routed through time code generator/character inserter 136 ("D") for a time stamp, through location/date inserter 138 ("E") for an operating room location/date stamp, and through ID/logo inserter 140 ("F") for a company name or logo stamp. The output of inserter 140 is connected to video distribution amplifier 142 (VDA-7) for further distribution of the signal within the master recording facility.

The microphone audio outputs 117 and 119 from operating room 10 appear on the codec outputs as a stereo signal (on two lines). Stereo audio signal 117 is connected to two 600 ohm to 600 ohm isolation transformers 144 (T3) and 146 (T4), and then to the inputs of two audio distribution amplifiers 148 (ADA-4) and 150 (ADA-5). Stereo audio output 119 follows a like path, being connected to two 600 ohm to 600 ohm isolation transformers 152 (T5) and 154 (T6), and then to two audio distribution amplifiers 156 (ADA-6) and 158 (ADA-7).

At least four VCR's, or some other form of reliable recording and storage device, are present at master recording facility 30 to provide continuous and overlapping storage of each and every audio/video record received from operating room 10. The video inputs of VCR 160 (VCR-1) and VCR 162 (VCR-2) are connected to outputs from video distribution amplifier 130, and the audio inputs of VCRs 160 and 162 are connected to the outputs of audio distribution amplifiers 148 and 150 (with the audio signals first passing through line buffer amplifiers 164 and 166). Thus, VCRs 160 and 162 record the room overview camera video (signal 95) along with the microphone audio (signal 117).

VCRs 168 (VCR-3) and 170 (VCR-4) take video feed from video distribution amplifier 142, and audio feed from audio distribution amplifiers 156 and 158 (the audio signals first pass through line buffer amplifiers 172 and 174). Accordingly, VCRs 168 and 170 record the overhead/scope camera video (signal 97) along with the microphone audio (signal 119).

The video outputs from VCRs 160 and 162 are looped through separate channels of a color monitor 176 (MON-3), and are then plugged into input ports 201 and 202 of engineering switcher 200 (ESW-2). Likewise, the video outputs from VCRs 168 and 170 are looped through separate channels of a-color monitor 178 (MON-4), and then plugged into input ports 203 and 204 of switcher 200.

The audio outputs of VCRs 160 and 162 pass through line buffer amplifiers 180 and 182 and are then plugged into, respectively, switcher input ports 201 and 202. The audio outputs of VCRs 168 and 170 pass through line buffer amplifiers 184 and 186 and are then plugged into, respectively, switcher input ports 203 and 204. Thus, the audio and video signals being recorded by each VCR are present at ports 201–204 of switcher 200.

Input ports 207 and 208 of switcher 200 receive the audio and video signals without having passed through the VCRs. Port 207 receives camera overview video from video distribution amplifier 130 and microphone audio from audio distribution amplifiers 148 and 150. Port 208 receives camera overhead/scope video from video distribution amplifier 142 and microphone audio from audio distribution amplifiers 156 and 158.

There are normalized video and audio patch fields within the system. Specified pieces of equipment at master recording site 30 have their inputs and outputs connected to the patch field for system testing, setup and equipment by-passing. Representative locations of connections to the patch field are designated as 220 in FIG. 4 (not all connections are labeled). Test signal generator 222 (TSG-2) outputs a color bar test signal to video distribution amplifier 224 (VDA-8) and an audio test tone to audio distribution amplifier 226 (ADA-8). The color bar test signal and test tone may be distributed to the video patch field at port 225 of amplifier 224 and ports 227 and 228 of amplifier 226. Outputs from amplifiers 224 and 226 are also connected to port 210 of switcher 200, so that the test signals may be accessed from the switcher.

The video Output from switcher 200 passes through a video waveform/vectorscope 230 (WFM/VEC-2) and then into 19" color monitor 232. In this manner, the video waveform and vectorscope output may be displayed as an overlay on the camera video picture. Switcher 200, vectorscope 230 and monitor 232 are all rack mounted in equipment rack 32 at master recording facility 30. The audio output from switcher 200 is fed to audio monitor 234.

Figure 5:
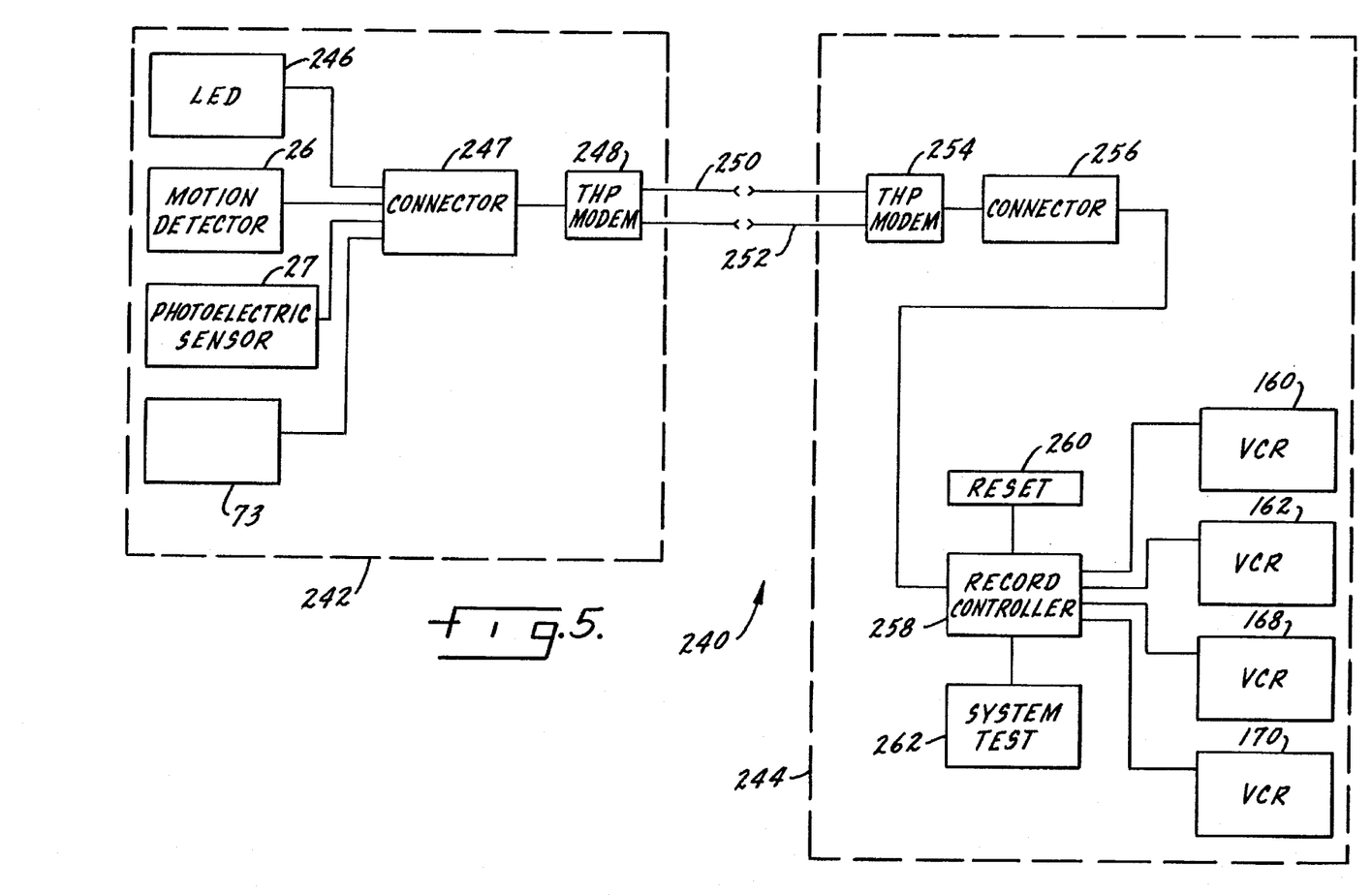
FIG. 5 is a diagram of a record control system which coordinates equipment in the operating room and master recording facility.

FIG. 5 is a diagram of a record control system 240 which coordinates the transmit site (operating room) and receive site (recording facility) equipment. Control system 240 has one section 242 in the transmit site and a second section 244 at the receive site. The transmit site section of the control system includes motion detector 26 (FIG. 1) mounted on top of overview camera 18, and photoelectric sensor 27 which is mounted on overhead fixture 14 next to overhead camera 12 and microphone 20. An LED 246 mounted in equipment rack 24 indicates the status of the system.

The output of the sensors is connected to telephone modem 248 (M-1) through an RS-232 connection 247. Modem 248 has an auto dial back-up and transmits and receives data information from receive site system section 244 on a telephone company supplied 2-wire voice/data telephone line 250. Appropriate commands are sent via modem 248 over the telephone lines to the receive site in response to stimulus detection by the sensors. Modem 248 is on continously to insure constant communication between the transmit and receive sites. A back-up voice/data telephone line 252 is connected to the modem to prevent breakdowns in communications between the two locations.

A modem 254 (M-2) at the receive site section 244 of record control system is connected to the two voice/data telephone lines. Modem 254 communicates via the telephone lines with modem 248 at the transmit site. A record controller 258 receives commands from modem 254 through an RS-232 connection 256. Record controller 258 translates the RS-232 commands into record commands for VCRs 160, 162, 168 and 170. Record controller 258 is programmed to start recording on the VCRs, stop recording and to start the second VCR of the group when necessary. With the VCRs set to record in a 6 hour mode, continuous recording is possible with tape changes necessary only every 5.5 to 6 hours.

Record controller 258 also sends RS-232 commands back to the transmit site to trigger record status light 246 and the system test relays. System reset button 260 allows the operator at the receive site to reset the system for operation at any time. System test button 262 triggers the test relays at the transmit-site, thereby injecting test color bars into the video paths and test audio tones into the audio paths. The test relays may also be triggered from the transmit site through use of test button 73.

Figure 6:
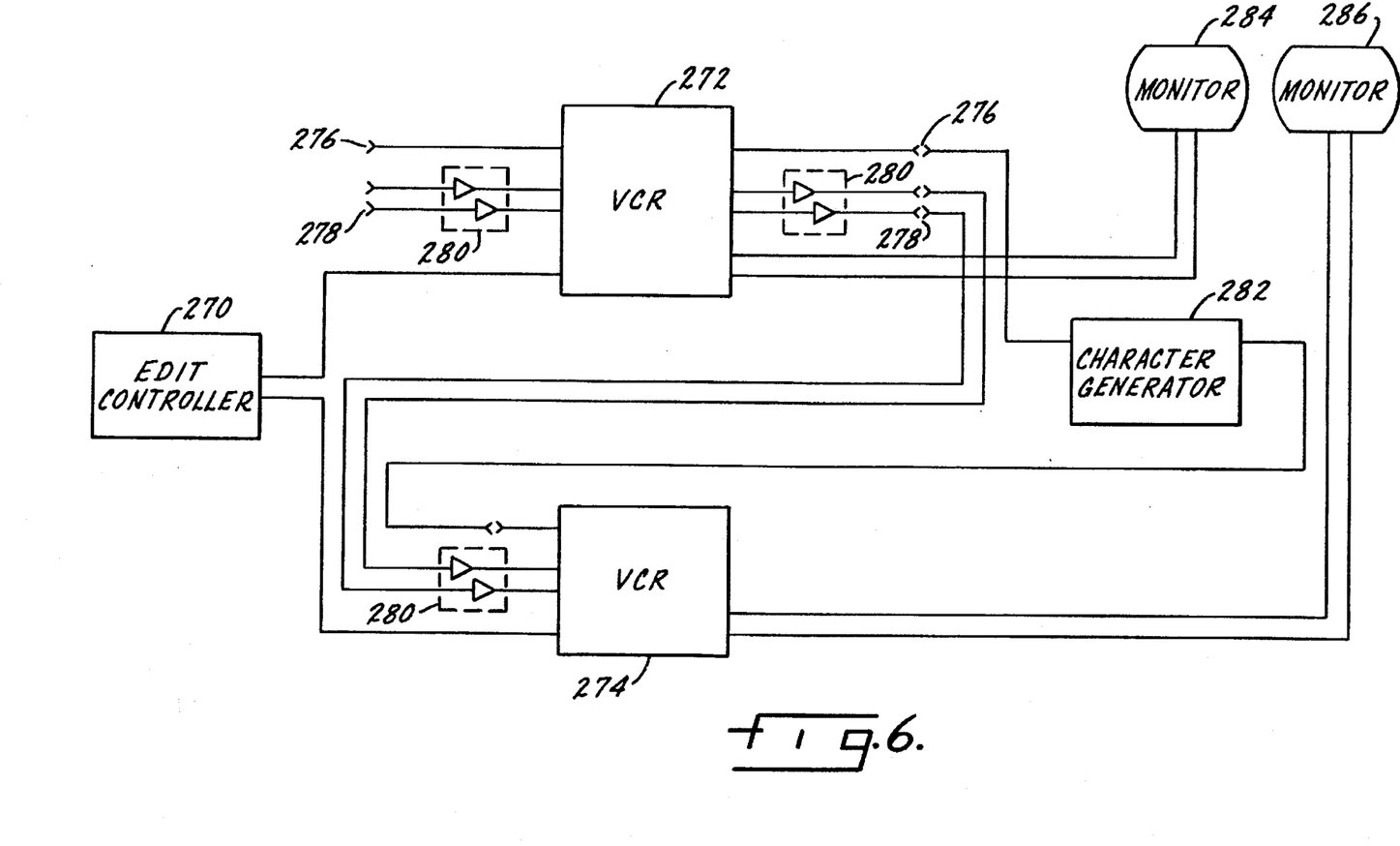
FIG. 6 is a detailed diagram of an off-line copy production system.

FIG. 6 shows an off-line copy production system which allows the operator to produce video tape copies from original recordings generated by the on-line system. An edit controller 270 controls VCRs 272 (VCR-5) and 274 (VCR-6). The tape to be copied is placed in VCR 272. If necessary, VCR 272 could be patched into the on-line system for input and output at video patching locations 276 and audio patching locations 278.

The audio output of VCR 272 passes through line buffer amplifiers 280, and then into the audio input of VCR 274. The video output of VCR 272 passes through character generator 282 (CG-1) before connecting to the video input of VCR 274. Character generator 282 can be used to overlay titles, advertising or copyright information on the copies. Monitors 284 (MON-6) and 286 (MON-7) are connected, respectively, to VCRs 272 and 274 to facilitate monitoring of the editing and copying process.

Following is a representative list of commercially available equipment which has been utilized in assembling a preferred embodiment of the present invention. This list is representative, not restrictive. Equivalent equipment, if available, may be substituted.

Operating Room (Transmit Site)

Overhead Camera 12: Sony Medical DXC-960MD Three Chip ½" CCD Color Video Camera.
Zoom Lens 13: Fujinon S12×7.5 BMD-D18 Remote Control Zoom Lens.
Adapter for Camera 12: Fujinon ECL-8072 Videoconferencing Accessories Close Up Adapter.
Camera Control Unit 40: Sony Medical RM-930 Remote Control for DXC-960MD Camera and Zoom Lens.
Overview Camera 18: Panasonic CCTV WV-CL322½" CCD Solid-State Color Camera.
Wide Angle Lens 19: Panasonic CCTV WV-LA608 Camera Aspherical High-Speed Auto Iris F0.75 6 mm Lens.
Monitor 22: Sony Medical PVM-1943MD 19" Fine Pitch Trinitron Color Monitor.
Monitor 76: Sony Medical PVM-1343MD 13" High Resolution Color Monitor.
Picture-in-Picture Unit 56: American Dynamics AD1571P Color PIP Monitor System.
Test Relays 42,46,52: FSR V-T A-B Video Switcher with Termination, Relay.
Test Relay 110: FSR LK-4 Audio Relay-Balanced Stereo A-B Switch.
Switcher 60: Sigma SVX-210 Series 210 10×1 Active Switcher-Video Only, Local Control, Vertical Interval.
Switcher 74: Sigma SAY-210 Series 210 10×1 Active Switcher-Mono-Audio & Video, Follow & Breakaway.
Video Distribution Amplifiers 44,48,54,58,72: Sigma VDA-2100 Series 2100 Modular-Wide Band Video Distribution Amplifier, 1×6, 90 MHz Bandwidth.
Audio Distribution Amplifiers 71,112,114: Sigma ADA-2110 Series 2100 Modular, Audio Distributio Amplifier, 1×6, 150 kHz Bandwidth.
Equalizing VDAs 90,92: Sigma VEQ-2101 Series 2100 Modular Distribution-Wideband Video Equalizer.
Test Signal Generator 70: Sigma CSG-455 Master Synchronizing Generator, RS-170A, Pulses, SC. & Black with Color Bars, Crosshatch, Red & Safe.
Waveform/Vectorscope 78: Hamlet HVI-303 Composite Precision Measuring Video Scope.
Hum Eliminators 94,96: BTS BHE 130 Wideband Hum Eliminator.
Isolation Transformers 116,118: FSR ATC-600 Audio 600-600 ohm Transformer Card.
Microphones 100,102: Shure Brothers SM89 Wired Microphone-Shotgun Condenser.
Mixer 108: Lectrosonics AM6 Commercial Sound-6 Channel Automatic Mixer With Tone Controls and Notch Filters.
Modem 248: Black Box RL-MD840A Modem 32192 terbo, 19.2 Kbps, Automatic Dial Back-Up, Async or Sync, 2-wire Switched Telephone Network, 2- and 4- Unconditional Leased Lines Operations.

Master Recording Facility (Receive Site)

VCRs-160,162,168,170,272,274: Panasonic AG-1970 Recorder/Player-S-VHS/VHS HiFi Editing VCR with Built-in Digital TBC.
Waveform/Vectorscope 230: Same as vectorscope 78 at transmit site.
Monitor 232: Same as monitor 76 at transmit site.
Monitors 230,232,284,286: JVC TM-900SU 9" Professional Color Monitor.
Character Generator 282: For-A VTW-120 Character Generator.
Edit Controller 270: Panasonic AG-A96 Editing Recorder/Player-Eight event editing controller with Jog/Shuttle Dial.
Audio Monitor 234: Logitec MON-S/2 Stereo Audio Monitor Panel.
Switcher 200: Sigma SSV-210 Series 210 10×1 Active Switcher-Stereo-Audio & Video, Follow & Breakaway.
VDAs 130,142,224: Same as VDAs at transmit site. ADAs 148,150,156,158,226: Same as ADAs at transmit site.

Equalizing VDAs 122,134: Same as equalizing VDAs at transmit site.

Test Generator 222: Same as test generator 70 at transmit site.

Hum Eliminators 120,132: Same as hum eliminators at transmit site.

Modem 254: Same as modem 248 at transmit site.

Time Code Generator/Character Inserters 124,136: Fast Forward Video F30 Time Code Generator/Character Inserter.

Location/Date Inserters 126,138: Broadcast Video Systems TDI-200 Time-Date-Ident Generator.

ID/Logo Inserters 128,140: QSI 808 Single Image Inserter.

Isolation Transformers 144,146,152,154: Same as isolation transformers at transmit site.

Various features of the present invention have been explained with reference to the embodiment shown and described. It must be understood, however, that modification may be made without departing from the spirit of the invention and scope of the following claims.

We claim:

1. A system for automatically producing audio/video records of each procedure performed in a surgical operating room comprising:

video cameras mounted in said operating room to generate video images of each surgical procedure performed;

microphones mounted in said operating room to pick up audio from each surgical procedure performed;

recording means located at a recording site remote from and independent of said operating room for creating audio/video records from the video images and audio generated by said video cameras and microphones;

a telephone communication link between said operating room and the remote location connecting the video cameras, microphones and recording means at said remote site; and sensors mounted in said operating room to detect the presence of persons and to start and stop said recording means in response thereto.

2. A system as claimed in claim 1, wherein a location, date and time stamp is overlaid on each audio/video record created.

3. The system of claim 1, wherein said sensors include a photoelectric sensor mounted adjacent to said overhead camera and a motion sensor mounted adjacent to said overview camera.

4. The system of claim 1 wherein said video cameras include an overhead camera mounted above a surgical table, an overview camera mounted near a periphery of said operating room, and a video input port for connection to a scope camera mounted on a surgical instrument.

5. The system of claim 4 wherein said microphones include a first microphone mounted above a surgical table in said operating room adjacent said overhead camera to pick up audio from a surgeon, a second microphone mounted near another personnel position, and an audio input port to permit connection to a third microphone system.

6. A method of audio and video recording of operating room surgical procedures, independent of hospital staff where the procedure is taking place and at a location remote from the hospital, using a plurality of audio microphone monitors and video camera monitors located in an operating room, and telephone communication links to connect the monitors with audio and video recording equipment at a remote location, said method including the steps of initiating audio and video recording at the remote location, automatically and without regard to hospital staff input, as soon as activity is detected in the operating room, and terminating recording when operating room activity ceases.

* * * * *